Nov. 29, 1966   G. H. SAMPSON   3,288,359

FAN AND METHOD OF MAKING THE SAME

Filed May 7, 1964   2 Sheets-Sheet 1

Inventor
George H. Sampson
by Roberts, Cushman & Grover
Att'ys

Nov. 29, 1966   G. H. SAMPSON   3,288,359
FAN AND METHOD OF MAKING THE SAME

Filed May 7, 1964   2 Sheets-Sheet 2

United States Patent Office 3,288,359
Patented Nov. 29, 1966

3,288,359
FAN AND METHOD OF MAKING THE SAME
George H. Sampson, Middleboro, Mass., assignor to Winthrop-Atkins Co., Inc., Middleboro, Mass., a corporation of Massachusetts
Filed May 7, 1964, Ser. No. 365,581
7 Claims. (Cl. 230—266)

This invention relates to fans and, in particular, to a fan-shaped flat blade that may be held in the hand and manipulated by oscillation to impart movement to the air adjacent the person to effect cooling.

The principal objects of the invention are to provide an improved fan blade which, by oscillation, will impart vigorous movement of air with the least amount of effort; to provide an improved blade which will embody sufficient stiffness to enable positive oscillation, accompanied by an amplified movement of a portion thereof, which will augment the oscillatory movement of the handle-held portion, so as to create a strong air flow; and to provide a blade which is of simple construction and durable.

As herein illustrated, the blade is comprised of a flat board having an arcuate end edge and side edges which converge therefrom to form a handle by means of which it may be grasped and manipulated, characterized in that the blade is stiffer in a direction parallel to a diagonal extending from substantially the midlength of one side edge to the midlength of the end edge. More specifically, this is accomplished by using a board having a definite grain in one direction and cutting the blade therefrom so that the diagonal is parallel to the grain. Optionally, corrugated board faced on one or both sides, or a board reinforced along spaced parallel lines by stripes of adhesive or thermoplastic faced on one or both sides may be employed.

The invention will now be described in greater detail with reference to the accompanying drawings wherein.

Figure 1:
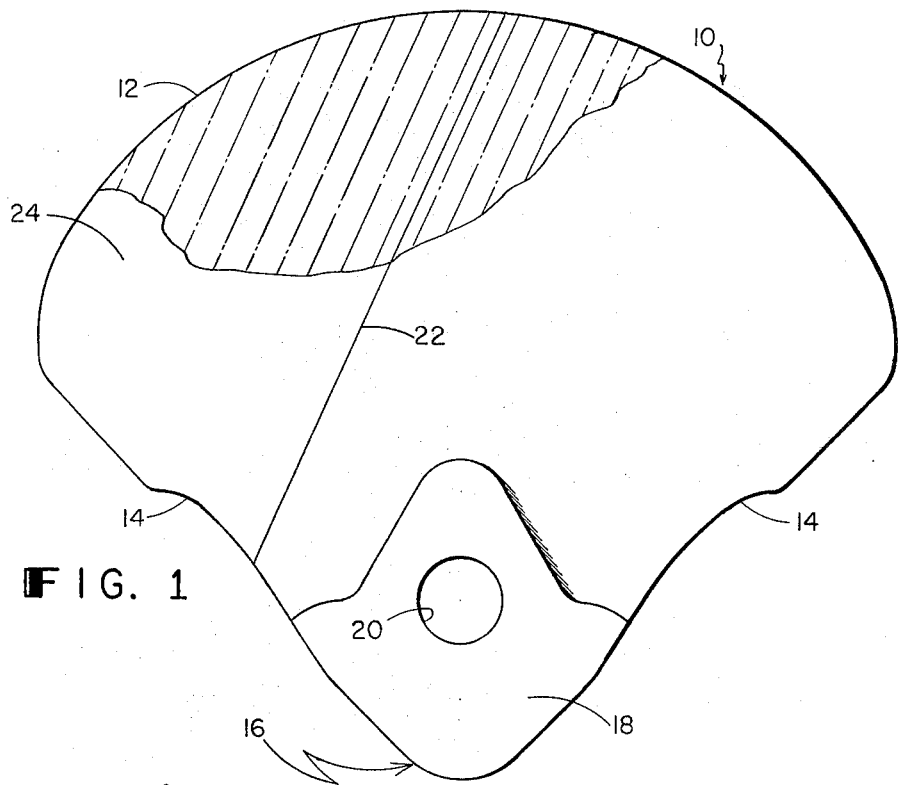
FIG. 1 is a plan view of the fan which forms the subject matter of this invention.

Referring to FIG. 1, the fan comprises a flat blade 10 having an arcuate end edge 12 and substantially straight side edges 14 which converge from the opposite ends of the arcuate edge to form a handle 16. The handle is preferably reinforced on one surface of the blade by a part 18 adhesively secured thereto and both the board and the reinforcement are provided with a hole 20 through which the thumb may be placed when holding the fan for use.

In accordance with this invention, the blade is formed of a paperboard in which the grain is unilateral so that it is stiffer lengthwise of the grain than it is crosswise thereof, and the blade is cut from the board so that the grain runs along a diagonal, represented by the line 22 on the face of the blade, which extends from substantially the midlength of the edge 14, at the left-hand side as shown in FIG. 1, to substantially the midlength of the end edge 12. As thus constructed, the lobe or portion 24 outwardly of the diagonal 22, with respect to the handle, constitutes the leading edge of the fan and when the fan is manipulated this edge will flex vigorously with respect to the diagonal 22 so as to vigorously propel the air with very little motion of the portion inwardly of the diagonal which includes the handle, the latter being relatively stiff and supporting the leading edge.

Figure 2:
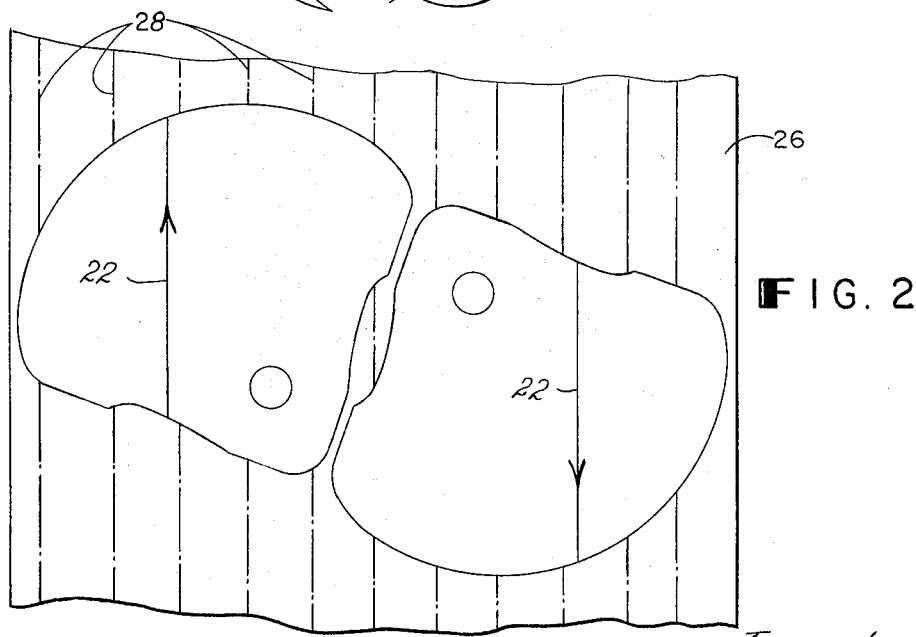
FIG. 2 is a plan view of a strip of board from which the fans are cut showing an arrangement for an economical use of the board which, at the same time, enables duplication of the characteristics which form the subject matter of this invention in the fans cut from the board.

FIG. 2 discloses a method for cutting the blades from sheet material 26, in which the grain 28 runs parallel to the opposite edges, by reversing the positions of the cutting dies so that the two fans are cut crosswise of the board with the diagonal of each parallel to the grain.

Figure 3:
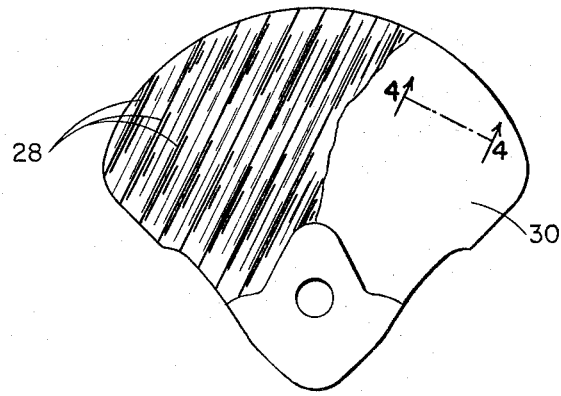
FIG. 3 is a plan view of a modified form in which a corrugated board is employed as the core and is faced on its opposite surfaces with a decorative material.
Figure 4:
FIG. 4 is a section taken on the line 4—4 of FIG. 3.

The fan may, as shown in FIGS. 3 and 4, be made of a core of corrugated paper or board 28 faced on one or both sides by paper 30 which is either decorative or adapted to receive advertising matter or both. The core piece is cut so that the corrugations run diagonally of the blade as shown, parallel to a diagonal starting substantially at the midpoint of one side and extending to substantially the midpoint of the end.

Figure 5:
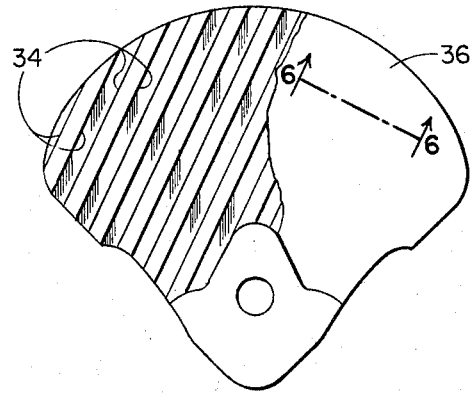
FIG. 5 is a plan view of another modification in which the core board is reinforced by parallel stripes and faced on one or both surfaces with a decorative paper.
Figure 6:
FIG. 6 is a section taken on the line 6—6 of FIG. 5 when the stripes are of exaggerated thickness.

Another way of achieving the stiffness desired is to apply, as shown in FIGS. 5 and 6, spaced parallel stripes 34 of a stiffening material, such as adhesive, thermoplastic, or the like, to one or both sides of a core ply 32 and facing the ply on one or both sides with a decorative ply 36.

While the fan is described as being made of paperboard it can be comprised of any suitable sheet material embodying or being modified to provide greater strength in one direction than the other.

It should be understood that the present disclosure is for the purpose of illustration only and that this invention includes all modifications and equivalents which fall within the scope of the appended claims.

I claim:

1. A fan comprising a flat blade having an arcuate end edge and side edges converging from the opposite ends of the end edge to form a handle portion by means of which the fan is adapted to be held for manipulation; characterized in that the board, of which the blade is made, is stiffer parallel to a diagonal extending from substantially the center of one side edge to substantially the center of the end edge than it is transversely of said diagonal, so that the lobe of the blade outwardly of the diagonal, with respect to the handle, flexes more readily than the portion of the blade inwardly of the diagonal with respect to the handle.

2. A fan according to claim 1, wherein the board of which the blade is comprised is corrugated and the corrugations are parallel to said diagonal.

3. A fan according to claim 1, wherein the board of which the blade is comprised is corrugated, the corrugations running parallel to said diagonal and is faced on one or both sides with a decorative material.

4. A fan according to claim 1, wherein the board of which the blade is comprised has spaced parallel stripes of stiffening material applied to one or both sides running parallel to said diagonal.

5. A fan according to claim 1, in which the board of which the blade is comprised has applied to one or both surfaces spaced parallel stripes of a thermoplastic resin running parallel to said diagonal and which has adhered to one or both sides a decorative material.

6. A fan comprising a flat blade having an arcuate end edge and side edges converging from the opposite ends of the end edge to form a handle portion by means of which the fan is adapted to be held for manipulation; characterized in that the board of the blade is stiffer parallel to a diagonal extending from substantially the center of one side edge to substantially the center of the end edge than it is at right angles thereto, so that the portion outwardly of the diagonal, with respect to the handle, is freer to flex than the portion inwardly thereof which includes the handle.

7. A fan comprising a flat blade having an arcuate end edge and side edges converging from the opposite ends of the end edge to form a handle portion by means of which the fan is adapted to be held for manipulation; characterized in that the board of the blade embodies a grain structure running parallel to a diagonal extending from substantially the midpoint of one side to substantially the midpoint of the arcuate side, so that the portion of the blade outwardly of the diagonal, with respect to the handle, is freer to flex than the portion of the blade inwardly of the diagonal which includes the handle.

References Cited by the Examiner

UNITED STATES PATENTS

| | | | |
|---|---|---|---|
| 58,250 | 9/1866 | Harper | 230—266 |
| 1,446,978 | 2/1923 | Lichter | 230—266 |
| 2,255,509 | 9/1941 | Lichter | 230—266 |

LAURENCE V. EFNER, *Primary Examiner.*